US008744988B1

(12) United States Patent
Hamon

(10) Patent No.: US 8,744,988 B1
(45) Date of Patent: Jun. 3, 2014

(54) PREDICTING USER NAVIGATION EVENTS IN AN INTERNET BROWSER

(75) Inventor: Dominic Hamon, San Francisco, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/183,824

(22) Filed: Jul. 15, 2011

(51) Int. Cl.
*G06N 5/00* (2006.01)
*G06F 7/00* (2006.01)
*G06N 99/00* (2010.01)

(52) U.S. Cl.
CPC .................................. *G06N 99/005* (2013.01)
USPC ............................................ 706/45; 707/705

(58) Field of Classification Search
None
See application file for complete search history.

(56) References Cited

U.S. PATENT DOCUMENTS

| | | |
|---|---|---|
| 5,715,445 A | 2/1998 | Wolfe |
| 5,946,682 A | 8/1999 | Wolfe |
| 6,055,569 A | 4/2000 | O'Brien et al. |
| 6,100,871 A | 8/2000 | Min |
| 6,151,603 A | 11/2000 | Wolfe |
| 6,182,133 B1 | 1/2001 | Horvitz |
| 6,301,576 B1 | 10/2001 | Wolfe |
| 6,604,103 B1 | 8/2003 | Wolfe |
| 6,976,090 B2 | 12/2005 | Ben-Shaul et al. |
| 7,047,502 B2 | 5/2006 | Petropoulos et al. |
| 7,103,594 B1 | 9/2006 | Wolfe |
| 7,277,924 B1 | 10/2007 | Wichmann et al. |
| 7,428,701 B1 | 9/2008 | Gavin et al. |
| 7,467,137 B1 | 12/2008 | Wolfe |
| 7,480,669 B2 | 1/2009 | Lo et al. |
| 7,487,147 B2 | 2/2009 | Bates et al. |
| 7,536,635 B2 | 5/2009 | Racovolis et al. |
| 7,613,712 B2 | 11/2009 | Greenblatt et al. |
| 7,716,332 B1 | 5/2010 | Topfl et al. |
| 7,747,749 B1 | 6/2010 | Erikson et al. |
| 7,802,305 B1 | 9/2010 | Leeds |
| 7,805,673 B2 | 9/2010 | der Quaeler et al. |
| 7,840,589 B1 | 11/2010 | Holt et al. |
| 7,876,335 B1 | 1/2011 | Pittenger et al. |
| 7,908,336 B2 | 3/2011 | Carlson et al. |
| 8,112,308 B1 | 2/2012 | Ho et al. |

(Continued)

FOREIGN PATENT DOCUMENTS

| | | |
|---|---|---|
| JP | 2004536389 A | 12/2004 |
| KR | 20070101237 A | 10/2007 |

(Continued)

OTHER PUBLICATIONS

StackOverflow.com, "Detect if Browser Tab Has Focus," Sep. 2011, 2 pages.

(Continued)

*Primary Examiner* — Alan Chen
(74) *Attorney, Agent, or Firm* — Lerner, David, Littenberg, Krumholz & Mentlik, LLP

(57) ABSTRACT

A method and system for predicting a next navigation event are described. Aspects of the disclosure minimize the delay between a navigation event and a network response by predicting the next navigation event. The system and method may then prerender content associated with the next navigation event. For example, the method and system may predict a likely next uniform resource locator during web browsing to preemptively request content from the network before the user selects the corresponding link on a web page. The methods describe a variety of manners of predicting the next navigation event, including examining individual and aggregate historical data, text entry prediction, and cursor input monitoring.

10 Claims, 6 Drawing Sheets

(56) References Cited

U.S. PATENT DOCUMENTS

| | | |
|---|---|---|
| 8,260,938 B2 | 9/2012 | Gupta et al. |
| 8,504,907 B2 | 8/2013 | Piersol |
| 2002/0075333 A1 | 6/2002 | Dutta et al. |
| 2003/0050906 A1 | 3/2003 | Clifton-Bligh |
| 2003/0061451 A1 | 3/2003 | Beyda |
| 2003/0088580 A1 | 5/2003 | Desai et al. |
| 2003/0212760 A1* | 11/2003 | Chen et al. .................. 709/218 |
| 2004/0267600 A1 | 12/2004 | Horvitz |
| 2004/0268228 A1 | 12/2004 | Croney et al. |
| 2005/0132296 A1 | 6/2005 | Milic-Frayling et al. |
| 2005/0240576 A1 | 10/2005 | Piscitello et al. |
| 2005/0251396 A1 | 11/2005 | Tyler |
| 2006/0047804 A1 | 3/2006 | Fredricksen et al. |
| 2006/0143568 A1 | 6/2006 | Milener et al. |
| 2006/0282771 A1 | 12/2006 | Vinci |
| 2007/0005425 A1 | 1/2007 | Bennett et al. |
| 2007/0198634 A1 | 8/2007 | Knowles et al. |
| 2007/0208704 A1 | 9/2007 | Ives |
| 2007/0220010 A1 | 9/2007 | Ertugrul |
| 2007/0226633 A1 | 9/2007 | Lyle et al. |
| 2007/0288648 A1 | 12/2007 | Mehanna et al. |
| 2008/0052219 A1 | 2/2008 | Sandholm et al. |
| 2008/0104407 A1 | 5/2008 | Horne et al. |
| 2008/0140941 A1 | 6/2008 | Dasgupta et al. |
| 2008/0201332 A1 | 8/2008 | Souders et al. |
| 2008/0208789 A1 | 8/2008 | Almog |
| 2008/0249969 A1 | 10/2008 | Tsui et al. |
| 2008/0256134 A1 | 10/2008 | Bogner et al. |
| 2008/0295006 A1 | 11/2008 | LuVogt et al. |
| 2009/0013006 A1 | 1/2009 | Friedl et al. |
| 2009/0070392 A1 | 3/2009 | Le Roy et al. |
| 2009/0094196 A1* | 4/2009 | Piwowarski et al. .............. 707/3 |
| 2009/0132949 A1 | 5/2009 | Bosarge |
| 2009/0158221 A1 | 6/2009 | Nielsen et al. |
| 2009/0171930 A1 | 7/2009 | Vaughan et al. |
| 2009/0216639 A1 | 8/2009 | Kapczynski et al. |
| 2009/0265774 A1 | 10/2009 | Malik et al. |
| 2009/0327424 A1 | 12/2009 | Bernstein et al. |
| 2010/0005061 A1 | 1/2010 | Basco et al. |
| 2010/0023581 A1 | 1/2010 | Lahav |
| 2010/0031366 A1 | 2/2010 | Knight et al. |
| 2010/0107115 A1 | 4/2010 | Sareen et al. |
| 2010/0131902 A1 | 5/2010 | Teran et al. |
| 2010/0191856 A1 | 7/2010 | Gupta et al. |
| 2010/0251116 A1 | 9/2010 | Rimas-Ribikauskas et al. |
| 2010/0306665 A1 | 12/2010 | Milic-Frayling et al. |
| 2011/0029518 A1 | 2/2011 | Tong |
| 2011/0029670 A1 | 2/2011 | Klein et al. |
| 2011/0119361 A1 | 5/2011 | Issa et al. |
| 2011/0173569 A1 | 7/2011 | Howes et al. |
| 2011/0199304 A1 | 8/2011 | Walley et al. |
| 2011/0225494 A1 | 9/2011 | Shmuylovich et al. |
| 2011/0289317 A1 | 11/2011 | Darapu et al. |
| 2012/0017146 A1 | 1/2012 | Travieso et al. |
| 2012/0084644 A1 | 4/2012 | Robert et al. |
| 2012/0254721 A1 | 10/2012 | Jain et al. |
| 2012/0254727 A1 | 10/2012 | Jain et al. |
| 2012/0324043 A1 | 12/2012 | Burkard et al. |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

U.S. Appl. No. 13/175,067, filed Jul. 1, 2011.
U.S. Appl. No. 13/100,615, filed May 4, 2011.
U.S. Appl. No. 13/175,115, filed Jul. 1, 2011.
U.S. Appl. No. 13/174,925, filed Jul. 1, 2011.
U.S. Appl. No. 13/174,928, filed Jul. 1, 2011.
U.S. Appl. No. 13/182,920, filed Jul. 14, 2011.
International Search Report & Written Opinion dated May 7, 2013 for Application No. PCT/US2013/021927.
https://developer.mozilla.org/en/Link_prefetching_FAQ (2003).
International Search Report and Written Opinion for Application No. PCT/US2012/042186 dated Feb. 20, 2013.
Fisher, Darin, "Link Prefetching FAQ," dated Mar. 3, 2003, published by Mozilla Developer Network (MDN), from https://developer.mozilla.org/en/Link_prefetching_FAQ (2003).
Christopher Schmitt, "CSS Cookbook, Third Edition," O'Reilly Media, Dec. 24, 2009, pp. 1, 33, 35 and 217-219.
Venoila et al. "T-Cube: A Fast, Self-Disclosing Pen-Based Alphabet". Copyright Date 1994.
Guimbretiere et al. "FlowMenu: Combining Command, Text, and Data Entry". Copyright 2000.
U.S. Appl. No. 13/353,626, filed Jan. 19, 2012.
International Search Report dated Nov. 28, 2012, in International Application No. PCT/US2012/036519.
International Search Report and Written Opinion dated Dec. 14, 2012 for PCT application US2012044896.
International Search Report and Written Opinion for Application No. PCT/US2012/055473 dated Feb. 26, 2013.

* cited by examiner

PREDICTING USER NAVIGATION EVENTS IN AN INTERNET BROWSER

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for predicting user navigation events are described. Aspects of the disclosure minimize the delay in accessing web content by predicting a user navigation event on a web page. The navigation event may be predicted by various indicators, including but not limited to a user's navigation history, aggregate navigation history, text entry within a data entry field, or a mouse cursor position. Users can be provided with an opportunity to op in/out of functionality that may collect personal information about users. In addition, certain data can be anonymized and aggregated before it is stored or used, such that personally identifiable information is removed.

Aspects of the disclosure provide a computer-implemented method for predicting a user navigation event. The method may include rendering a web page in a web browser, identifying a user navigation event within the web browser, in response to the user navigation event, storing an address of the web page and a destination address associated with the user navigation event in a data structure, the data structure comprising a map indexed by one or more source addresses, the one or more source addresses being mapped to one or more destination addresses, each destination address being associated with a frequency value indicating a number of visits to the destination address from an associated source address of the one or more source addresses, determining, using a processor, a probability value representing a likelihood of selection of each destination address from each source address, and using the probability value for each likelihood to predict a next navigation event. The user navigation event may be at least one of selection of a hyperlink and entering text within an address bar. The probability value may be determined by dividing the frequency of a particular destination URL from a particular source URL by the frequency of all navigation events from the particular source URL. The method may include prerendering the next navigation event. The method may include prerendering each navigation event having its probability value greater than a threshold value. The method may include prerendering the next navigation event in response to the frequency value of the destination address associated with the next navigation event being greater than a threshold frequency.

Aspects of the disclosure provide a computer-implemented method for predicting a user navigation event. The method may include rendering a web page in a web browser, identifying, using a processor, one or more hyperlinks within the web page, determining, using the processor, a probability value representing a probability of selection of each of the one or more hyperlinks using a navigation history, the navigation history comprising a map indexed by one or more source addresses, the one or more source addresses being mapped to one or more destination addresses, each destination address being associated with a frequency value indicating a number of visits to the destination address from an associated source address of the one or more source addresses, and prerendering a hyperlink with the highest probability value. The method may also include identifying a user navigation event within the web browser, and in response to the user navigation event, storing an address of the web page and a destination address associated with the navigation event in the navigation history. The method may also include prerendering each hyperlink with a probability value greater than a threshold probability value. The probability value may be determined by dividing the frequency of a particular destination URL from a particular source URL by the frequency of all navigation events from the particular source URL.

Aspects of the disclosure provide a processing system for accessing network content. The processing system includes at least one processor, and a memory, coupled to the at least one processor, for storing a navigation history comprising a map indexed by one or more source addresses, the one or more source addresses being mapped to one or more destination addresses, each destination address being associated with a frequency value indicating a number of visits to the destination address from an associated source address. The processor is configured to render a web page in a web browser, identify one or more hyperlinks within the web page, determine a probability value representing a probability of selection of each of the one or more hyperlinks using the navigation history, and prerender a hyperlink with the highest probability value. The processor may be further configured to identify a user navigation event within the web browser; and in response to the navigation event, store an address of the web page and a destination address associated with the navigation event in the navigation history. The processor may be further configured to prerender each hyperlink with a probability value greater than a threshold probability value. The probability value may be determined by dividing the frequency of a particular destination URL from a particular source URL by the frequency of all navigation events from the particular source URL.

Aspects of the disclosure further provide a non-transitory computer readable storage medium containing instructions that, when executed by a processor, perform a method. The method includes rendering a web page in a web browser, identifying a user navigation event within the web browser, in response to the user navigation event, storing an address of the web page and a destination address associated with the user navigation event in a data structure, the data structure comprising a map indexed by one or more source addresses, the one or more source addresses being mapped to one or more destination addresses, each destination address being associated with a frequency value indicating a number of visits to the destination address from an associated source address of the one or more source addresses, determining a probability value representing a likelihood of selection of each destination address from each source address, and using the probability value for each likelihood to predict a next navigation event. The user navigation event may be at least one of selection of a hyperlink and entering text within an address bar. The probability value may be determined by dividing the frequency of a particular destination URL from a particular source URL by the frequency of all navigation events from the particular source URL. The method may further include prerendering the next navigation event. The method may also include prerendering each navigation event having its probability value greater than a threshold value. The method may also include prerendering the next navigation event in response to the frequency value of the destination address associated with the next navigation event being greater than a threshold frequency.

DETAILED DESCRIPTION

Embodiments of a system and method for predicting user navigation events are described herein. Aspects of this disclosure minimize the delay between a navigation event and a network response by predicting the next navigation event. The system and method may prerender content associated with the next navigation event. For example, the method and system may predict a likely next uniform resource locator during web browsing to preemptively request content from the network before the user selects the corresponding link, thus reducing or eliminating the wait time when a user selects a hyperlink on a web page. Various methods describing a variety of manners of predicting the next navigation event, including examining individual and aggregate historical data, text entry prediction, and cursor input monitoring are described. Aspects of the disclosure relate to the prediction of the immediate user navigation (e.g. the next link the user is likely to select when viewing a particular web page, such as within the next 30 seconds, the next minute, or the next 5 minutes).

Figure 1:
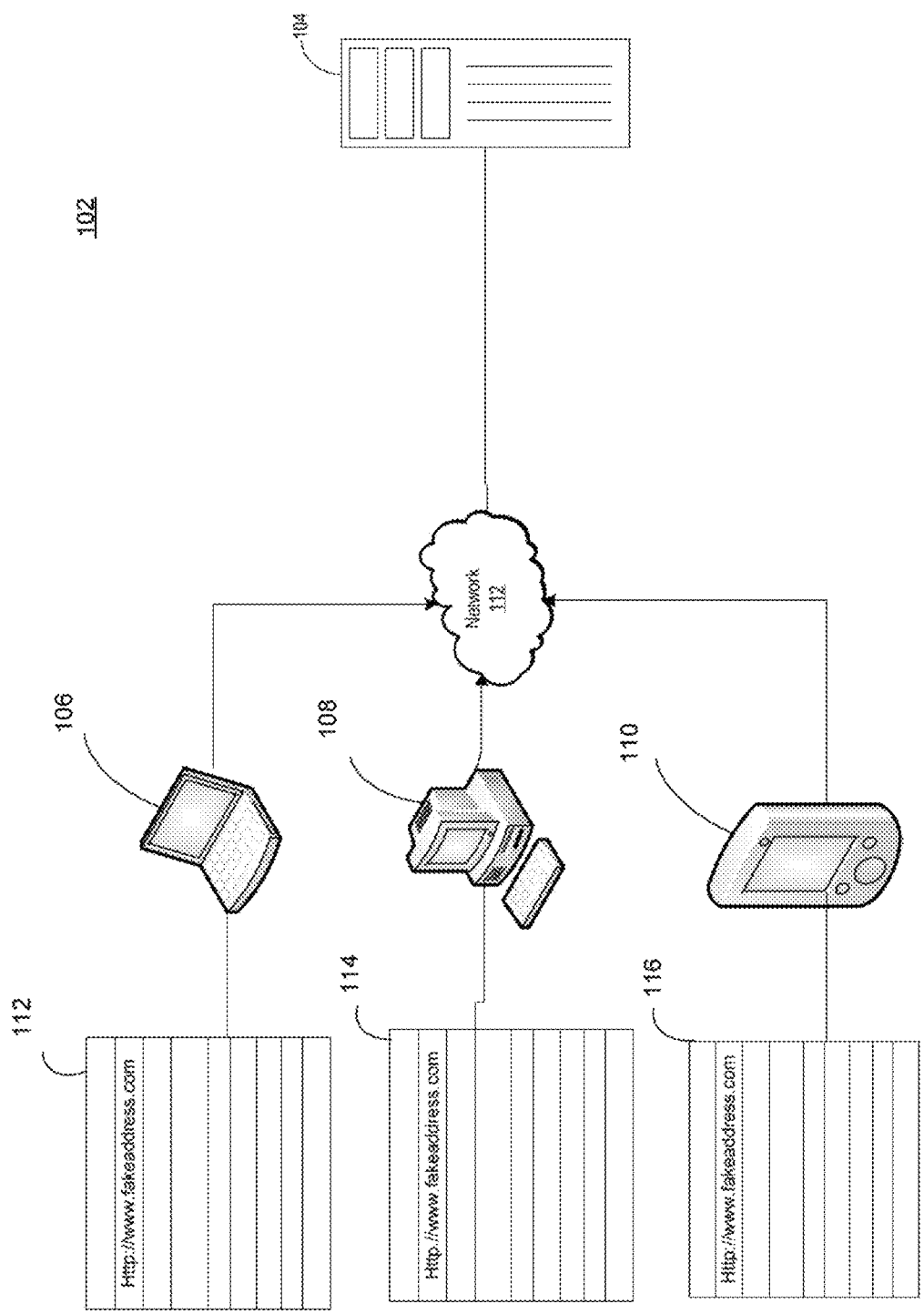
FIG. 1 is a system diagram depicting an example of a server in communication with example client devices in accordance with aspects of the disclosure.

As shown in FIG. 1, an example system 100 in accordance with one embodiment includes a server 104 in communication (via a network 112) with one or more client devices 106, 108, 110 displaying web browser interfaces 114, 116, 118.

The client devices 106, 108, 110 are operable to perform prerendering operations during the execution of a web browser application. The server 104 may transmit navigation history data to the client devices 106, 108, 110, to enable prediction of a next navigation event. In some aspects, the client devices 106, 108, 110 determine a next navigation event using a local navigation history and generate a web request to the server 104 to prerender the content associated with the next navigation event. For example, the user of the client device 106 may browse to a web page located at "www-.fakeaddress.com" as displayed on the web browser interface 112. That page includes content selectable by the user. Based on the user's navigation history, the client device 106 may determine which of the selectable content the user is likely to select, and then prerender the content associated with the selectable content by requesting the content from the server 104.

As another example, the client device 108 may display www.fakeaddress.com within a browser 114. The client device 108 may receive an aggregate set of navigation statistics from the server 104, and then determine which selectable content the user is likely to select based upon the aggregate set of navigation statistics. As yet another example, the client device 110 may display www.fakeaddress.com within a browser 116. The client device 108 may determine which selectable content the user is likely to select based upon a cursor position within the browser 114.

While the concepts described herein are generally discussed with respect to a web browser, aspects of the disclosure can be applied to any computing node capable of managing navigation events over a network, including a server 104.

The client devices 106, 108, 110 may be any device capable managing data requests via a network 112. Examples of such client devices include a personal computer (PC) 108, a mobile device 110, or a server 104. The client devices 106, 108, 110 may also comprise personal computers, personal digital assistants ("PDA"): tablet PCs, netbooks, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 are operable to predict navigation events to assist in data access on the network 112. For example, the client devices may predict a likely navigation event to facilitate prerendering of a web page in order to improve the user's browsing experience. In some aspects, the server 104 provides navigation data that may be used by the client devices 106, 108, 110 to predict a likely navigation event (See FIGS. 6-8). In some aspects, the client devices 106, 108, 110 predict a likely navigation event using local data. (See FIGS. 3-5, 9-10).

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
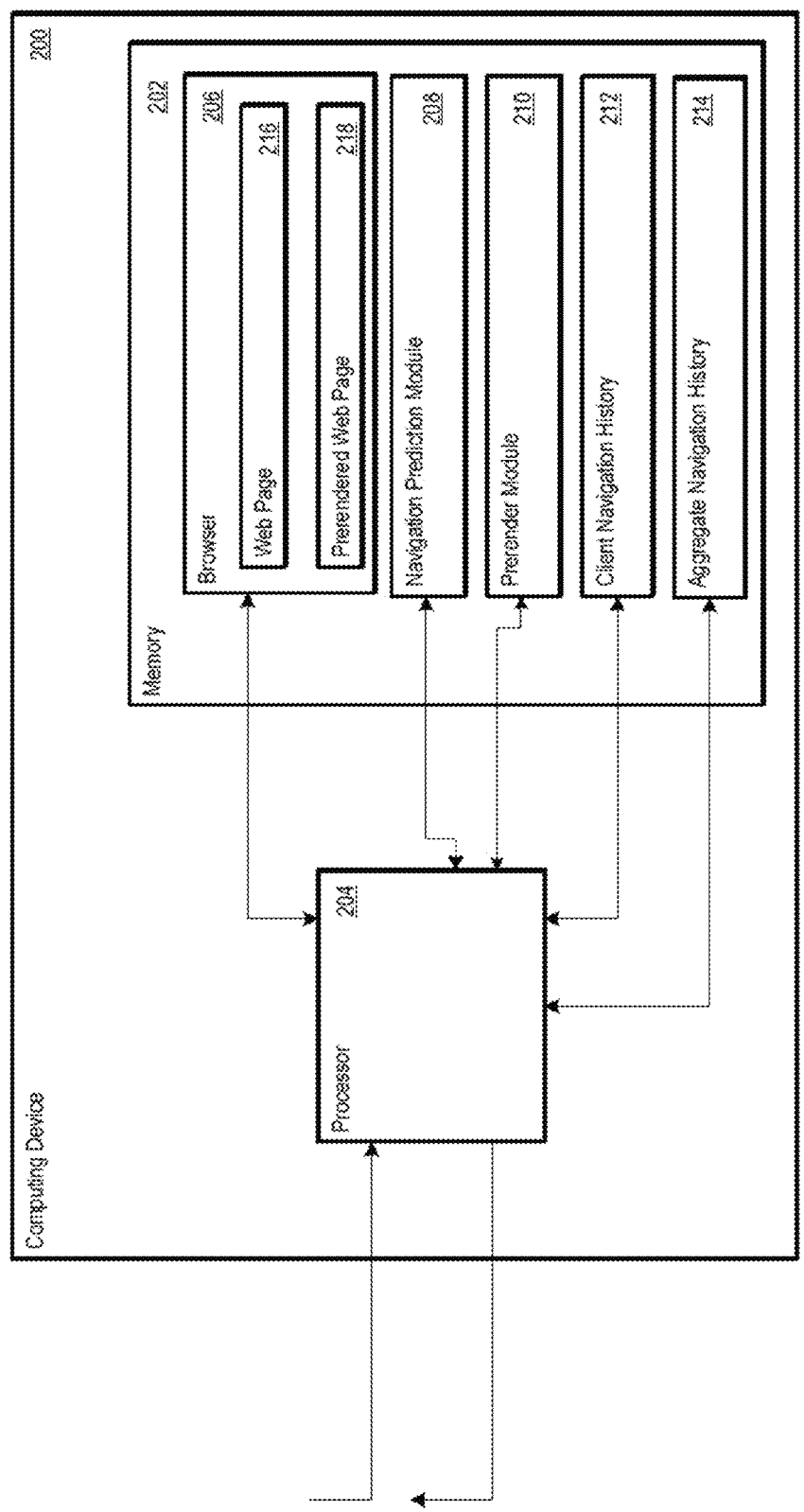
FIG. 2 is block diagram depicting an example computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions and data that are accessible by the processor 204. The processor 204 may execute the instructions and access the data to control the operations of the computing device 200.

The memory 202 may be any type of memory operative to store information accessible by the processor 120, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions may be stored in object code format for direct processing by the processor 204, or in any other computer language including scripts or collections of independent source code modules that are interpreted on demand or compiled in advance. Functions, methods and routines of the instructions are explained in more detail below (See FIGS. 3-10).

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor may be a dedicated controller such as an application-specific integrated circuit ("ASIC").

Although FIG. 2 functionally illustrates the processor and memory as being within a single block, it should be understood that the processor 204 and memory 202 may comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicate with other nodes of the network. For example, the computing device 200 may comprise a web server that is operative to communicate with client devices via the network such that the computing device 200 uses the network to transmit and display information to a user on a display of the client device.

In some examples, the system provides privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed.

In order to facilitate the navigation event prediction operations of the computing device 200, the memory 202 may further comprise a browser 206, a navigation prediction module 208, a prerender module 210, a client navigation history 212, and an aggregate navigation history 214. Although a number of discrete modules (e.g., 206, 208, 210, 212 and 214) are identified in connection with FIG. 2, the functionality of these modules can overlap and/or exist in a fewer or greater number of modules than what is shown, with such modules residing at one or more processing devices, which may be geographically dispersed. The browser 206 provides for the display of a web page 216 to a user of the client device by sending and receiving data across a computer network. The web page 216 may be received in response to a network request, such as a Hypertext Transfer Protocol (HTTP) GET request. The web page 216 may be provided in a markup language, such as Hypertext Markup Language (HTML). The web page 216 may also include various scripts, data, forms, and the like, including interactive and executable content such as ADOBE FLASH content, JAVASCRIPT content, and the like.

The browser 206 may further comprise a prerendered web page 218. The prerendered web page 218 represents a web page that was requested and accessed by the prerender module 210 in response to a predicted navigation event provided by the navigation prediction module 208. In the event the user inputs a navigation event as predicted by the prediction module 208, the browser 206 may swap the prerendered web page 218 with the web page 216, thus providing the content associated with the navigation event without the need to send another network request. In some aspects, the swap may occur before the prerendered web page 218 has finished loading. In such cases, the partially loaded prerendered web page 218 may be swapped in to continue loading as the active page.

The memory 202 may further comprise a prerender module 210 to perform fetching of a next web page as identified by the navigation prediction module 208. The prerender module 210 sends a network request for the web page identified to be the likely next navigation destination that the user will select. The web page received in response to this request is then stored in the browser 206 as the prerendered web page 218. In some aspects, the web page request generated by the prerender module 210 is identical to a standard web page request. In some aspects, the web page request generated by the prerender module 210 comprises certain features to facilitate the prerender process.

The memory 202 may also store a client navigation history 212 and an aggregate navigation history 214. The client navigation history 212 comprises a set of navigation events associated with past activity of the browser 206. The client navigation history 212 may track a set of visited URLs, also known as a "clickstream," which tracks an order in which the user typically visits URLs (e.g. when the user visits a news website, they tend to next select a URL corresponding to the top story of the day), a set of access times associated with the URLs, and the like. In some aspects, the client navigation history 212 comprises a set of URLs and a frequency with which the user has visited each URL. In some aspects, the client navigation history comprises a set of URL pairs, representing a source URL and a destination URL. The aggregate navigation history 214 may comprise similar data as the client navigation history 212, but keyed to multiple users rather than a single user. As with the client navigation history 212, the aggregate navigation history 214 may be stored as a set of URLs and a frequency for each, or a set of URL pairs representing a transition from a source URL to a destination URL.

The client navigation history 212 and aggregate navigation history 214 may represent data collected using one or more browser add-ons, scripts, or toolbars. In some aspects, the client navigation history 212 and/or aggregate navigation history 214 are maintained on a remote server, such as the server 104, and provided to the computing device 200. The computing device 200 may maintain separate records to facilitate the predicting of a next likely navigation event, or it may act in concert with remotely stored data. In some aspects, only aggregate navigation history 214 pertaining to the particular web page the user is currently viewing is provided to the computing device 200 (See FIGS. 6 and 8).

As described above, the aggregate navigation history data 214 can be maintained in an anonymous fashion, with privacy protections for the individual client data that comprises the aggregate navigation history, including, for example, anonymization of personally identifiable information, aggregation of data, filtering of sensitive information, encryption, hashing or filtering of sensitive information to remove personal attributes, time limitations on storage of information, and/or limitations on data use or sharing. The aggregate navigation history 214 data can be anonymized and aggregated such that individual client data is not revealed.

Figure 3:
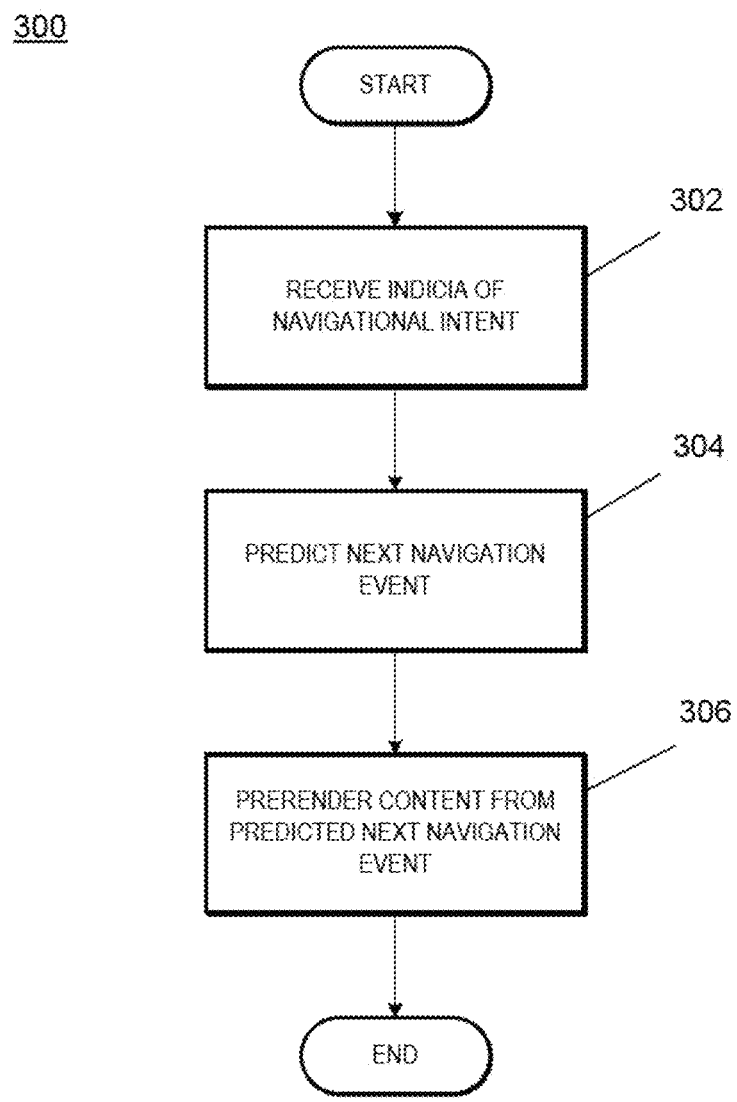
FIG. 3 is a flow diagram depicting an example method for prerendering a web page based upon a predicted navigation event in accordance with aspects of the disclosure.

FIG. 3 is a flow diagram depicting an example method 300 for prerendering a web page based upon a predicted navigation event in accordance with aspects of the disclosure. Aspects of the method 300 operate to identify one or more likely navigation destinations from a set of navigation indicators, and then prerender the identified navigation destinations. The method 300 may be performed by a computing device, such as the computing device 200, to eliminate delays in the user web browsing experience by prerendering web pages that are identified as likely navigation targets by the user. For example, the method 300 may be performed by elements of the browser 206, the navigation prediction module 208, and the prerender module 210 acting together. While aspects of the method 300 are described with respect to the computing device 200, the method 300 may also be performed by the server 104, or any device with hardware and/or software designed to accept instructions.

At stage 302, the computing device 200 receives one or more indicators of navigational intent. Navigational intent may be any action that would tend to indicate that the user will generate a particular network request, such as a request for a particular web page. For example, the indicators may provide metrics by which to determine what the particular request will be, such as a confidence value. For example, the user may navigate to a certain web page, from which they generally navigate to another certain web page based upon their browsing history, or the user may move his mouse cursor towards a particular hyperlink embedded within a web page. In some aspects, the indicator is received from a remote server, such as a search engine that embeds an indicator within search results, indicating that most users that submit a particular search query select a particular search result.

At stage 304, after receiving the indicator of navigational intent, the computing device 200 attempts to predict the most likely navigation event. In short, the computing device 200 makes a best guess of to where the user is likely to navigate next, based upon the indicator. Methods of performing this prediction are described below. (See FIGS. 4-10).

At stage 306, the computing device 200 prerenders the content from the predicted next navigation event as determined at stage 304. The prerendering process may include storing a prerendered web page within a browser, such as the prerendered web page 218. The computing device 200 may prerender a single web page predicted as the most likely navigation event, or the computing device 200 may prerender multiple pages. In some aspects, the computing device 200 determines the number of pages to prerender based upon one or more system capabilities of the computing device 200, such as available system resources, available network bandwidth, processor speed, installed memory, and the like. In some aspects, the number of pages to prerender may be configurable in one or more user settings. After prerendering the content associated with the navigation event(s), the method 300 ends.

Multiple methods for predicting a next navigation event are provided below. While each method is described separately, it should be appreciated that aspects of the methods may be combined to improve navigation prediction operations.

Figure 4:
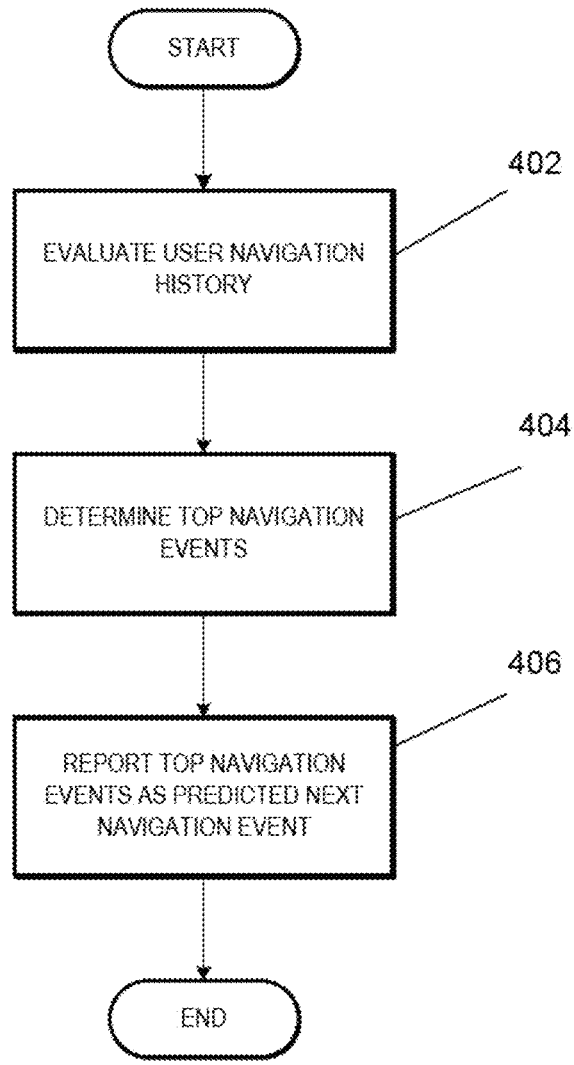
FIG. 4 is a flow diagram depicting an example method for predicting a navigation event based on a client navigation history in accordance with aspects of the disclosure.

FIG. 4 is a flow diagram depicting an example method 400 for predicting a navigation event based on a client navigation history in accordance with aspects of the disclosure. The method 400 provides for storing a navigation history for a user, and predicting a next navigation event based upon a navigation history of a particular user. As above, the method 400 may be performed by a computing device such as the computing device 200. In particular, the method 400 may be performed by a navigation prediction module executing on a processor, such as the navigation prediction module 208.

At stage 402, the computing device 200 tracks a user navigation history. For example, the computing device 200 may store records of web pages visited by the user, such as the browsing history commonly maintained in web browsers. The browsing history may comprise the URLs of the web pages visited by the user, the order in which the URLs were visited, and the manner in which the user selected the URL (e.g. whether the URL was a clicked hyperlink, typed into an address bar, a redirect operation from another web page, etc.).

At stage 404, the computing device 200 determines a most likely navigation event or events based upon the user navigation history. The most likely navigation events may be determined by identifying the globally most visited pages for the user, or the navigation events may be associated with one or more current criteria. For example, the computing device 200 may examine the user's navigation history to determine that, when the user is viewing a particular news web page, they almost always select a link to the top news story on that page, or that when the user first opens the browser in the morning, they are likely to navigate to their bank account page to check their daily balance. The computing device 200 may employ various rules, heuristics, and filters to determine the most likely navigation event from the user history. The computing device 200 may associate each navigation event with a particular confidence value, indicating the likelihood that the user will select each navigation event. These confidence values may then be used to sort the navigation events to determine the most likely navigation event. A method to determine a confidence value for a given navigation event is described further below (See FIG. 5).

At stage 406, the computing device 200 reports the most likely navigation event as the predicted navigation event. For example, these predicted most likely navigation event may then be employed by the method described above (See FIG. 3) to facilitate prerendering of the web pages associated with the most likely navigation event.

Figure 5:
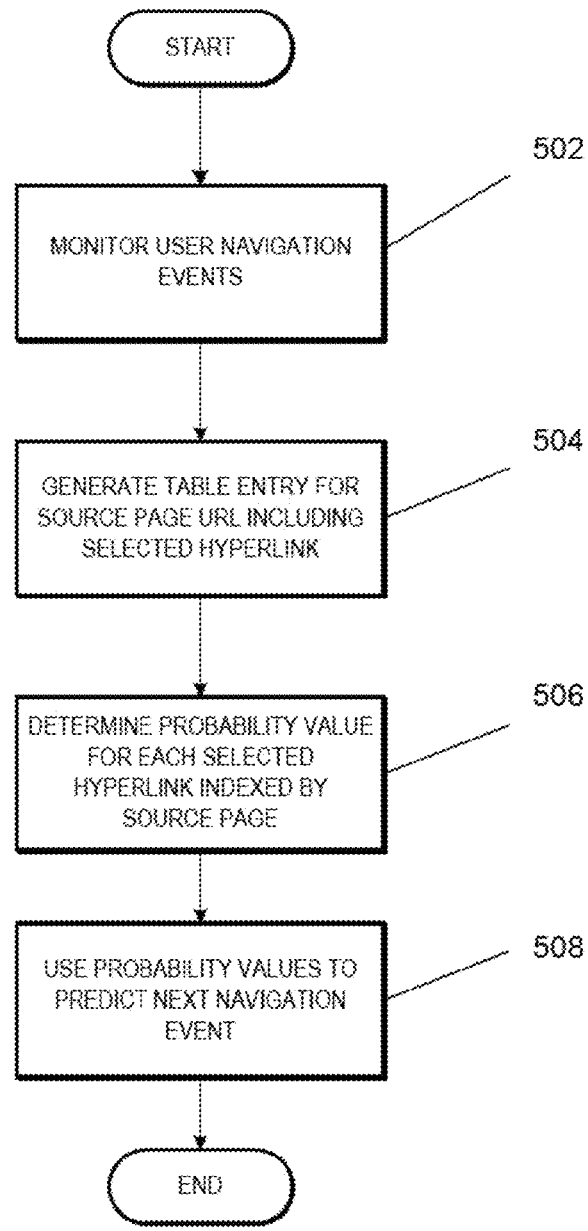
FIG. 5 is a flow diagram depicting an example method for generating a client navigation history comprising URL transitional pairs in accordance with aspects of the disclosure.

FIG. 5 is a flow diagram depicting an example method 500 for generating a client navigation history comprising URL transitional pairs in accordance with aspects of the disclosure. The method 500 creates a user navigation history that includes data that records source and destination URL pairs to determine a probability that a user intends to navigate to a particular destination page from a particular source page. The data may comprise a map of each source URL the user has visited along with the destination URLs visited from each source URL. The map data structure provides a straightforward way to estimate the probability that a user will navigate to a particular link based upon past navigation history.

At stage 502, user navigation events, such as hyperlink selection or URL entry within an address bar, are monitored. As described above, monitoring of user data is performed in an "opt-in" manner, and all navigation data is stored locally except where the user gives express consent to share the navigation data.

When a navigation event occurs, a data entry is created at stage 504. The data entry includes the source page (e.g., the page the user was viewing when the navigation event occurred), and the URL associated with the navigation event (e.g., the address associated with a selected hyperlink or the URL entered within the address bar). The data entry may be created within a map data structure, indexed by the URL of the source page. For example, the map data structure may take the following format:

$$[URL\ A] \rightarrow \{['a'],3],['b',4],['c',1]\} \quad (Eq.\ 1)$$

"URL A" describes the source URL. The entries for 'a', 'b', and 'c' each refer to destination URLs visited from the source URL A. The numbers after each of the destination URLs identify the frequency with which each destination URL was visited from URL A. Every time a new destination URL is visited from URL A, the new destination URL is added to the map (e.g., when a new URL 'd' is visited, the entry ['d', 1] is added). If a previously visited destination URL is visited from URL A, the frequency value for the destination URL is incremented (e.g., when URL 'a' is visited again, the frequency value is updated to 4).

The frequency data may be used to determine a probability for each possible destination URL from each source URL, at stage 506. For example, the probability of visiting a particular destination URL from a particular source URL may be determined by dividing the frequency of visits to the destination URL by the total frequency of visits to the source URL. The map data structure may be sorted by the number of visits to each destination URL. For example, the map described in Eq. 1 might be ordered:

$$[URL\ A] \rightarrow \{['b',4],['a',3],['c',1]\} \quad (Eq.\ 2)$$

Ordering the map in this manner allows the map to track the most frequently visited destination URL without the need to recalculate the probability of each destination URL for every visit to the page.

At stage 508, the probability values are used to predict the next navigation event. As described above, the next navigation event may be used to determine the target web page for prerendering. The prediction process may also include various heuristics, such as requiring a minimum frequency of visits to a destination URL before prerendering, prerendering all destination URLs with greater than a threshold probability value, or the like.

Figure 6:
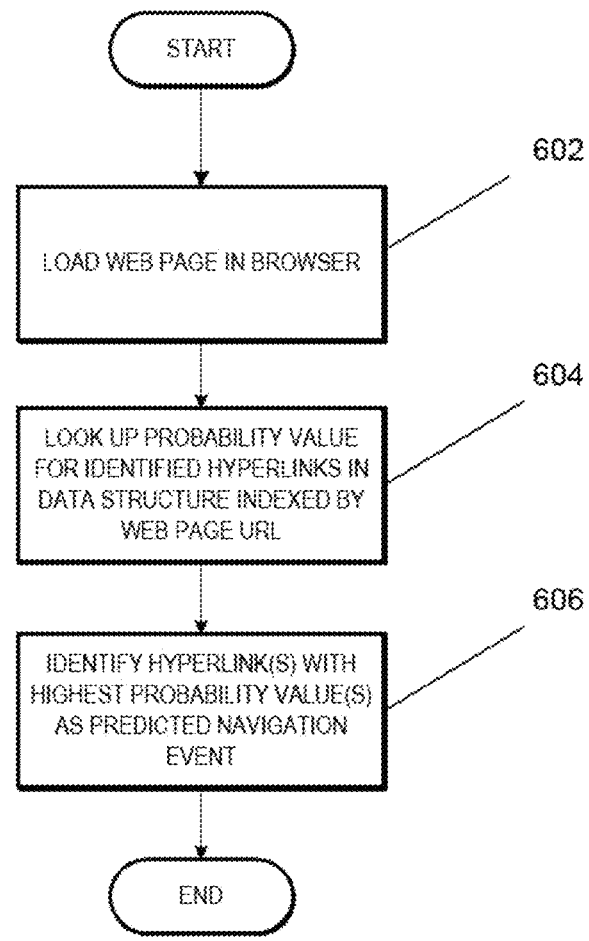
FIG. 6 is a flow diagram depicting an example method for predicting a navigation event based on a client navigation history comprising URL transitional pairs in accordance with aspects of the disclosure.

FIG. 6 is a flow diagram depicting an example method 600 for predicting a navigation event based on a client navigation history comprising URL transitional pairs in accordance with aspects of the disclosure. Once the navigation history map data structure has been created, the data stored therein may be used to identify target pages for prerendering. The links on a viewed page may be analyzed using the using the navigation history to determine the link the user is most likely to select.

At stage 602, a web page is loaded within a web browser. The web page is associated with a particular URL, and this URL likely contains one or more destination links for navigation. As the page is loaded, any links are identified with the browser for lookup in the navigation history.

At stage 604, the probability value for each link is looked up in the navigation history map data structure. For example, in a map data structure indexed by source URL (e.g., the URL of the loaded page), the method may immediately return the destination page associated with the source URL that has the highest probability value. In some instances, the list of links currently available on the page is compared to the list of links within the map. For example, a dynamically generated web page may not always contain the same links. As it would not be suitable to prerender a web page that cannot be selected (e.g., a destination link that is in the history associated with the source URL with a high frequency, but not on the currently displayed web page), the destination link with the highest probability that is also displayed on the page may be identified as the most probably navigation event.

At stage 606, the link or links with the highest probability value or values are identified as predicted navigation events. These predicted navigation events may be used for prerendering as described above. The method may identify multiple links as predicted links where system resources are sufficient to prerender multiple pages, or only the link with the highest probability may be identified where a single prerender instance is supported. As described above, various heuristics may also be applied to the prediction step, including only prerendering where there is a minimum frequency associated with the destination page, prerendering all destination URLs with greater than a threshold probability value, or the like.

The stages of the illustrated methods described above are not intended to be limiting. The functionality of the methods may exist in a fewer or greater number of stages than what is shown and, even with the depicted methods, the particular order of events may be different from what is shown in the figures.

The systems and methods described above advantageously provide for an improved browsing experience. By predicting the next navigation event, the browser can perform prerender operations to minimize the amount of time users wait for web pages to load. Multiple methods to perform the prerender operations provide a flexible and robust system for determining the next navigation event.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for predicting a user navigation event, the method comprising:
   rendering a web page in a web browser;
   identifying a user navigation event within the web browser;
   in response to the user navigation event, storing an address of the web page and a destination address associated with the user navigation event in a data structure, the data structure comprising a map indexed by one or more source addresses, the one or more source addresses being mapped to one or more destination addresses, each destination address being associated with a frequency value indicating a number of visits to the destination address from an associated source address of the one or more source addresses;
   determining, using a processor, a probability value representing a likelihood of selection of each destination address from each source address, wherein the probability value is determined by dividing the frequency of a particular destination URL from a particular source URL by the frequency of all navigation events from the particular source URL; and
   using the probability value for each likelihood to predict a next navigation event.

2. The method of claim 1, wherein the user navigation event is at least one of selection of a hyperlink and entering text within an address bar.

3. The method of claim 1, further comprising:
   prerendering the next navigation event.

4. The method of claim 1, further comprising prerendering each navigation event having its probability value greater than a threshold value.

5. The method of claim 1, further comprising prerendering the next navigation event in response to the frequency value of the destination address associated with the next navigation event being greater than a threshold frequency.

6. A non-transitory computer readable storage medium containing instructions that, when executed by a processor, perform a method comprising:
   rendering a web page in a web browser;
   identifying a user navigation event within the web browser;
   in response to the user navigation event, storing an address of the web page and a destination address associated with the user navigation event in a data structure, the data structure comprising a map indexed by one or more source addresses, the one or more source addresses being mapped to one or more destination addresses, each destination address being associated with a frequency value indicating a number of visits to the destination address from an associated source address of the one or more source addresses;
   determining a probability value representing a likelihood of selection of each destination address from each source address, wherein the probability value is determined by dividing the frequency of a particular destination URL from a particular source URL by the frequency of all navigation events from the particular source URL; and
   using the probability value for each likelihood to predict a next navigation event.

7. The non-transitory computer-readable storage medium of claim 6, wherein the user navigation event is at least one of selection of a hyperlink and entering text within an address bar.

8. The non-transitory computer-readable storage medium of claim 6, further comprising:
   prerendering the next navigation event.

9. The non-transitory computer-readable storage medium of claim 6, further comprising prerendering each navigation event having its probability value greater than a threshold value.

10. The non-transitory computer-readable storage medium of claim 6, further comprising prerendering the next navigation event in response to the frequency value of the destination address associated with the next navigation event being greater than a threshold frequency.

* * * * *